United States Patent
Gregg et al.

[11] Patent Number: 5,930,068
[45] Date of Patent: Jul. 27, 1999

[54] DETECTING SERVO DEFECTS IN A DISC DRIVE

[75] Inventors: Jason D. Gregg; Timothy T. Walker, both of Edmond, Okla.

[73] Assignee: Seagate Technology, Inc., Scotts Valley, Calif.

[21] Appl. No.: 08/723,513

[22] Filed: Sep. 30, 1996

Related U.S. Application Data

[60] Provisional application No. 60/015,144, Apr. 5, 1996.

[51] Int. Cl.$^6$ .................................................. G11B 5/596
[52] U.S. Cl. ...................................... 360/77.05; 360/78.09
[58] Field of Search .................................... 360/75, 77.01, 360/77.04, 77.05, 77.08, 78.04, 78.05, 78.07, 78.09, 78.14

[56] References Cited

U.S. PATENT DOCUMENTS

| | | | |
|---|---|---|---|
| 5,241,433 | 8/1993 | Anderson et al. | 360/77.04 |
| 5,369,345 | 11/1994 | Phan et al. | 360/78.09 X |
| 5,576,909 | 11/1996 | Dierkes et al. | 360/78.09 |
| 5,602,689 | 2/1997 | Kadlec et al. | 360/78.09 X |
| 5,617,536 | 4/1997 | Freitas et al. | 360/78.14 X |

*Primary Examiner*—Aristotelis M. Psitos
*Assistant Examiner*—K. Wong
*Attorney, Agent, or Firm*—Crowe & Dunlevy

[57] ABSTRACT

Apparatus and method for detecting servo defects in a disc drive, the servo defects providing false indications of the position of a disc drive head with respect to a selected track. During use of a position error signal (PES) to position the head with respect to the selected track, the PES comprising a sequence of PES samples, the disc drive determines a first difference term as a selected combination of a first set of PES samples. A second, subsequent difference term is also generated as a selected combination of a second set of PES samples, the second set of PES samples including at least one PES sample which does not appear in the first set of PES samples. The magnitudes of the first and second difference terms are compared to a predetermined threshold, and a servo defect is detected at such time that both the first and second difference terms exceed the predetermined threshold and the first difference term exceeds the second difference term. Additionally, at such time that the first difference term exceeds the predetermined threshold and the second, subsequent difference term does not, the disc drive determines whether a servo defect flag has previously been set indicative of the presence of a servo defect, and if the servo defect flag has not been previously set, the drive identifies the presence of a servo defect and sets the servo defect flag.

14 Claims, 4 Drawing Sheets

DETECTING SERVO DEFECTS IN A DISC DRIVE

CROSS-REFERENCE TO RELATED APPLICATIONS

This application claims priority to Provisional application Ser. No. 60/015,144, filed Apr. 5, 1996.

STATEMENT REGARDING FEDERALLY SPONSORED RESEARCH OR DEVELOPMENT

Not Applicable

BACKGROUND OF THE INVENTION

This invention relates generally to the field of disc drive data storage devices, and more particularly, but not by way of limitation, to an apparatus and method for detecting servo defects in a disc drive in order to provide improved servo control.

Disc drives typically comprise one or more rotatable discs which are selectively magnetized by a corresponding array of selectively positionable read/write heads in order to store data on the surfaces of the discs during a write operation. During a read operation, the heads sense polarity transitions in the magnetization of the discs in order to reconstruct the data which was previously stored on the discs.

As will be recognized, data is stored on the surfaces of the discs on tracks which concentrically extend about the center of the disc surfaces. A closed loop servo system (also known as a servo loop) is typically provided to sense and control the position of the heads relative to the tracks.

One well known type of servo system is referred to as a dedicated servo, wherein one surface of one of the discs is dedicated to servo information and the remaining surfaces of the discs are used to store data. By using the head associated with the dedicated servo surface to read the servo information, the position of this head can be readily controlled (for reference, this head is commonly referred to as a servo head). Further, because all of the heads are nominally aligned by an actuator assembly, control of the position of the servo head results in corresponding control of the position of the remaining heads, also referred to as data heads. An example of a dedicated servo system is disclosed in U.S. Pat. No. 5,262,907 entitled HARD DISC DRIVE WITH IMPROVED SERVO SYSTEM, issued to Duffy et al., assigned to the assignee of the present invention and incorporated herein by reference.

As track densities in recent generations of disc drives have continued to increase, the trend in the industry is to use a second type of servo system commonly referred to as an embedded servo. As will be recognized, use of an embedded servo results in both servo information and user data being intermittently stored on each track, so that each head operates as both a servo head and a data head. Accordingly, as a selected track passes adjacent a head, the servo information read by the head is provided to the servo loop; moreover, as the head passes over data portions of the selected track, the head operates in conjunction with a disc drive read/write channel to read or write data, respectively, to the data portions of the selected track.

The servo loop typically controls the position of the head through the generation of a position error signal (PES) from the servo information. The PES comprises a series of sample values having a magnitude indicative of the relative position of the head with respect to the track. More particularly, during track following in which the head is caused to follow a selected track, the servo system generates the PES from the received servo information and then uses the PES to generate a correction signal which is provided to a power amplifier to control the amount of current through a coil of the actuator assembly. The coil is immersed in a magnetic field of a voice coil motor, so that the current causes the coil, and hence the head, to move relative to the discs in order to adjust the position of the head.

Typically, the PES is presented as a position dependent signal having a magnitude generally indicative of the relative distance between the head and the center of a track and a polarity indicative of the direction of the head with respect to the track center. Thus, it is common for the PES to have normalized values ranging from, for example −1.0 to +1.0 as the head is swept across the track and to have a value of 0 when the head is positioned over the center of the track. It will be recognized that the PES is generated by the servo loop by comparing the relative signal strengths of burst signals generated from precisely located magnetized fields (servo fields) in the servo information on the disc surface.

As discussed more fully in the previously incorporated Duffy et al. U.S. Pat. No. 5,262,907, the servo fields are generally arranged in an offset checkerboard pattern (also referred to as a quadrature pattern) so that, through manipulation of the magnitudes of the burst signals provided to the servo system as the servo fields are read, the relative position of the head to a particular track center can be determined and controlled. More particularly, samples of digital representations of the analog burst signals are typically provided to a servo loop microprocessor, which obtains a digital representation of the value of the PES from a selected combination of the input digital representations of the analog burst signals. The microprocessor then compares the value of the PES to a desired value indicative of the desired position of the head relative to the selected track and issues a digital correction signal to the power amplifier, which in turn provides an analog current to the actuator coil to adjust the position of the head accordingly.

It follows that an important consideration in digital servo systems is accurately determining the relationship between the value of the PES and the corresponding distance the head is from a known position, for example the center of a track, in order to effect accurate control of the head position. It has been found to be generally desirable to configure the servo system so as to generate a nominally linear PES over the width of a track.

It will be recognized that accurate control of the position of the heads is of paramount importance in the reliable reading and writing of data to the discs. The servo loop generally attempts to maintain the head over the center of the selected track so as to minimize the potential for overwriting data on adjacent tracks or having the magnetization of adjacent tracks interfere with the reading of the data stored on the selected track. Thus, it is common during read and write operations to compare the absolute value of each PES sample to a predetermined safe-threshold value in order to assure the head is correctly positioned relative to the track. Should the value of the PES for a particular sample exceed the threshold, the read or write operation is temporarily suspended until the PES is brought back down to a safe value.

There are generally two reasons why a selected PES sample will have a value which exceeds the safe-threshold value during a read or write operation: either the head is actually positioned at a location sufficiently distant from the center of the track so that the threshold value is exceeded, or a defect exists in the servo information so that the head is correctly positioned, but the reported PES sample is erroneous.

As to the first reason, it will be recognized that mechanical shocks supplied to the disc drive during operation can result in movement of the head away from the center of the selected track (sometimes referred to as an off-track condition). As a result, it is desirable to suspend the read or write operation while the head is in such an off-track condition.

As to the second reason, however, it will be recognized that defects can exist in the servo information written to the discs during manufacture of the disc drive. Such defects in the servo information can occur as a result of a localized anomaly in the media on the surface of a disc, so that the media does not possess the necessary magnetic properties to allow the servo information to be written at this location. Additionally, errors can also occur during the servo track writing process during manufacture of the disc drive, so that incorrect servo information is provided to the disc at a particular location.

Regardless of the source of the defect in the servo information, such a defect is manifested as a one sample error in the PES. The erroneous PES sample does not provide a true indication of head position relative to the center of the selected track, and further, if the erroneous PES sample is interpreted by the servo loop as an impulse function, an unwanted oscillatory response will be induced into the system.

Because of the problems associated with defects in the servo information, it is desirable to provide a servo loop which is capable of determining when an off-track condition is caused by a true positioning problem (and make the necessary position corrections) and when an off-track condition is caused by a servo defect (and ignore the erroneous PES sample). However, prior art servo loops have heretofore been generally unsuccessful in distinguishing excursions in the PES that are caused by servo defects from those caused by external shocks to a drive. This is particularly true in servo loops which rely on the PES value to identify off-track conditions.

Further, a marginal (relatively small) servo defect can cause a PES excursion that does not exceed an off-track threshold, but still lowers the ability of the drive to detect off-track write faults. As a result, a marginal servo defect may not be detected in a non-shock environment or at the beginning of life for the drive, but low levels of vibration or read performance degradation as a result of age or temperature can lead to unexpected, subsequent errors during the life of the drive.

There is a need, therefore, for an improved approach to detecting servo defects in a disc drive, such approach distinguishing erroneous PES samples which do not give true indications of head position from true PES samples which indicate actual step-impulse movements of the head as a result of, for example, mechanical shocks to the drive.

BRIEF SUMMARY OF THE INVENTION

The present invention provides a method and apparatus for detecting servo defects in a disc drive, allowing erroneous PES samples, which are not indicative of the actual position of the head, to be distinguished from true PES samples, which are indicative of an actual step-impulse movement of the head.

Accordingly, in the preferred embodiment of the present invention, a PES comprising a sequence of samples is generated and used to control the position of a head with respect to a selected track. A first difference term is generated from the PES as a selected combination of a first set of PES samples. Additionally, a second, subsequent difference term is also generated as a selected combination of a second set of PES samples, the second set of PES samples including at least one PES sample which does not appear in the first set of PES samples.

The magnitudes of the first and second difference terms are compared to a predetermined threshold, and a servo defect is detected at such time that both the first and second difference terms exceed the predetermined threshold and the first difference term exceeds the second difference term. Additionally, at such time that the first difference term exceeds the predetermined threshold and the second, subsequent difference term does not, the disc drive determines whether a servo defect flag has previously been set indicative of the presence of a servo defect, and if the servo defect flag has not been previously set, the drive identifies the presence of a servo defect and sets the servo defect flag.

Preferably, the first difference term, also referred to as the previous second difference, is generated from the relationship $A_{n-1}=|S_{n-1}-2S_{n-2}+S_{n-3}|$, and the second difference term, also referred to as the present second difference, is generated from the relationship $A_n=|S_n-2S_{n-1}+S_{n-2}|$, with $S_n$ comprising the most recent PES sample and $S_{n-1}$, $S_{n-2}$ and $S_{n-3}$ comprising the three immediately previous PES samples in the sequence, respectively.

An object of the present invention is to detect servo defects in a disc drive, such servo defects providing erroneous PES samples which falsely indicate step-changes in position of the head with respect to the selected track.

Another object of the present invention is to differentiate between erroneous PES samples and PES samples which do indicate a step-change in position of the head as a result of a mechanical shock to the drive.

Yet another object of the present invention is to identify marginal servo defects which are not sufficiently severe to be detected as off-track conditions, but do cause undesirable oscillation of the head about the track.

Still another object of the present invention is to facilitate the use of higher track densities in a disc drive.

Yet another object of the present invention is to map out servo defects on the surface of a disc.

Other objects, advantages and features of the present invention will be apparent from the following description when read in conjunction with the drawings and appended claims.

BRIEF DESCRIPTION OF THE SEVERAL VIEWS OF THE DRAWINGS

FIG. 6 is a graphical representation of PES samples and corresponding second difference terms, illustrating the capability of the second difference terms to distinguish between true and erroneous PES samples.

DETAILED DESCRIPTION OF THE INVENTION

Figure 1:
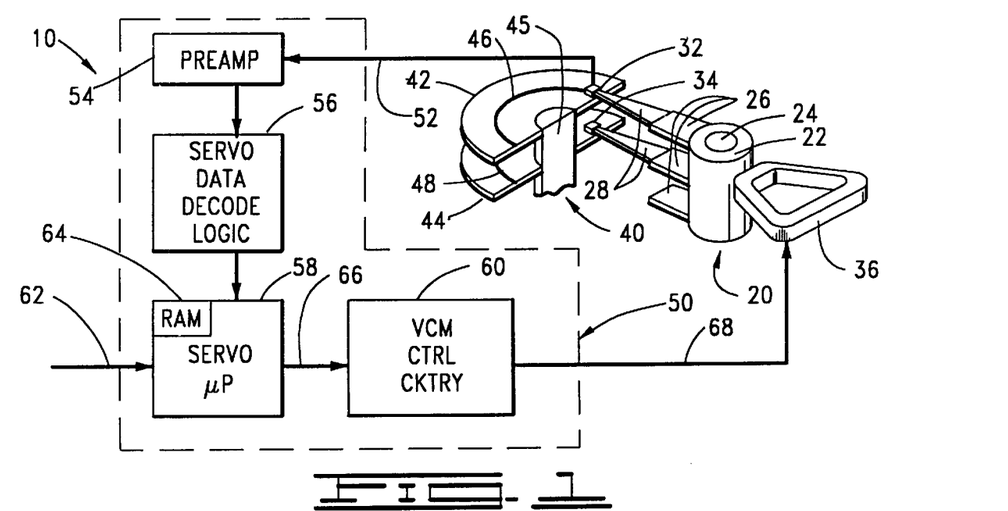
FIG. 1 is a functional block representation of a servo system for a disc drive in which the present invention is particularly useful.

Turning now to the drawings and more particularly to FIG. 1, shown therein is a functional block representation of a servo system for a disc drive (generally denoted as 10) of the present invention. More particularly, FIG. 1 shows the disc drive 10 to include an actuator assembly 20, a disc stack 40 and a servo loop 50, with the servo loop 50 operably controlling radial position of the actuator assembly 20 with respect to the disc stack 40.

The actuator assembly 20 comprises an actuator body 22 that pivots about a bearing-shaft assembly 24. The actuator body 22 includes actuator arms 26 that extend radially as shown from the actuator body 22, and gimbal assemblies 28 extend from each of the actuator arms 26. Mounted at the distal end of each of the gimbal assemblies 28 is a head (two shown in FIG. 1 at 32 and 34, respectively). Additionally, an actuator coil 36 is mounted to the actuator body 22 opposite the actuator arms 26. The coil 36 is part of a conventional voice coil motor (VCM) comprising the coil 36 as well as a pair of permanent magnets (not shown) located above and below the coil 36, so that the coil 36 interacts with the magnetic field established by these magnets as current is passed through the coil 36, resulting in controlled rotational movement of the actuator body 22 about the bearing-shaft assembly 24.

Continuing with FIG. 1, the disc assembly 40 comprises a plurality of discs (two shown at 42 and 44, respectively) mounted to a spindle motor hub 45 for rotation at a constant high speed by a conventional spindle motor (not shown). The surfaces of the discs 42 and 44 comprise a plurality of radially concentric tracks, two of which are shown at 46 and 48, respectively.

It will be recognized that in a typical disc drive there will be one head per disc surface, but for purposes of clarity only two heads 32 and 34 have been shown in FIG. 1, which correspond to the top surfaces of the discs 42 and 44. It will further be recognized that servo information will be prerecorded on at least one of the surfaces of the discs 42, 44 to provide the requisite servo positioning information to the servo loop 50. As provided hereinabove, in a dedicated servo system one surface of one disc is designated as a dedicated servo surface (such as the top surface of the disc 42) so that servo information is prerecorded on all of the tracks on the surface (including track 46) and user data is stored on the tracks of the remaining disc surfaces, such as on track 48 of the top surface of the disc 44; in such a case the head 32 would be a servo head and the head 34 would be a data head. Alternatively, in an embedded servo system, the servo information is intermittently prerecorded on all of the disc surfaces, so that each of the tracks 46 and 48 would contain both servo information and user data and the heads 32 and 34 would operate as both servo and data heads. The present invention is not dependent upon the type of servo system implemented; however, for purposes of clarity it is contemplated that at least track 46 includes servo information that is read by the head 32 and provided to the servo loop 50.

The servo loop 50 receives the servo information from the head 32 on signal path 52 and this servo information is amplified by a preamp circuit 54 and provided to servo data decode logic circuitry 56. The servo data decode logic circuitry 56 includes an analog to digital converter (ADC) so that selected digital representations of the servo information are provided to a servo microprocessor 58. In a manner to be described in more detail below, the servo microprocessor generates discrete, digital PES samples (which in total comprise the PES) from the servo information and uses the PES samples to generate and output correction signals to VCM control circuitry 60. The servo microprocessor 58 determines the correction signals in accordance with commands received by a disc drive system microprocessor (not shown) by way of signal path 62 and programming steps stored in servo RAM 64.

The correction signals are provided by way of signal path 66 to the VCM control circuitry 60, which includes a power amplifier (not shown) that outputs a controlled dc current of a selected magnitude and polarity to the coil 36 by way of signal path 68 in response to the correction signals. Thus, during a track following mode in which the head 32 is continuously positioned over a selected track, such as the track 46, the servo information indicates the relative position error of the head 32 with respect to the center of the track 46 and the resulting correction signals adjust the amount of the dc current applied to the coil 36 in order to compensate for this position error and move the head 32 to the center of the track 46. A detailed discussion of the construction and operation of the servo loop 50 can be found in the previously incorporated Duffy et al. reference, U.S. Pat. No. 5,262,907 as well as U.S Pat. No. 5,136,439 entitled SERVO POSITION DEMODULATION SYSTEM, issued Aug. 4, 1992 to Weispfenning et al., assigned to the assignee of the present invention and incorporated herein by reference.

Figure 2:
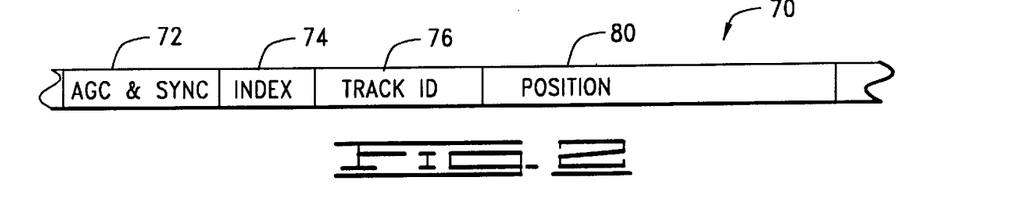
FIG. 2 provides a representation of the general format of a servo frame of the disc drive servo system of FIG. 1.

As will be recognized, the servo information is recorded during the manufacturing of the disc drive 10 using a highly precise servo writer. The servo information serves to define the boundaries of each of the tracks and is divided circumferentially into a number of frames. The general format of one such frame 70 is shown in FIG. 2. More particularly, FIG. 2 shows the frame 70 to comprise a plurality of fields, including an AGC & Sync field 72, an index field 74, a track ID field 76 and a position field 80. Of particular interest is the position field 80, but for purposes of clarity it will be recognized that the AGC & Sync field 72 provides input for the generation of timing signals used by the disc drive 10, the index field 74 indicates radial position of the track and the track ID field 76 provides the track address. Of course, additional fields may be used as desired and the format of the fields in a servo frame will depend upon the construction of a particular disc drive; for more detailed discussion of typical servo fields see the previously incorporated Duffy et al. U.S. Pat. No. 5,262,907 and Weispfenning et al. U.S. Pat. No. 5,136,439 references.

Figure 3:
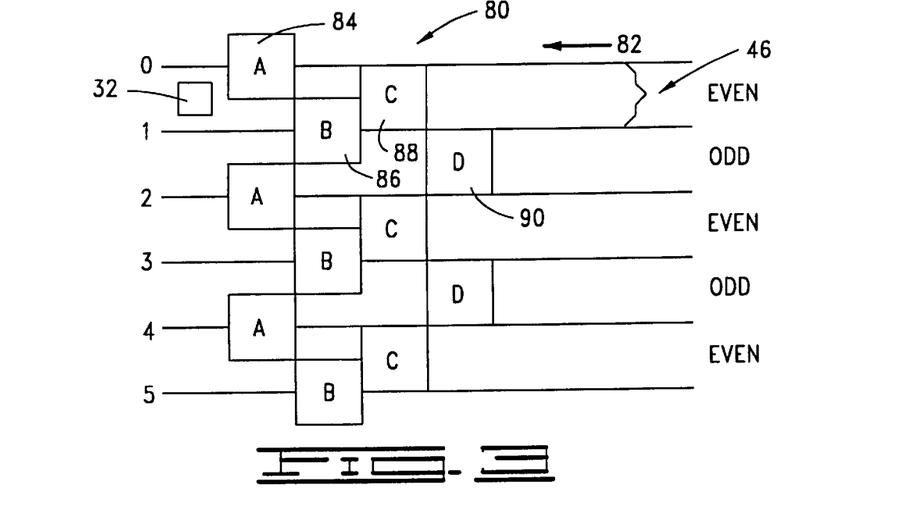
FIG. 3 shows the four position burst fields of the servo frame of FIG. 2.

The position field 80 comprises four position burst fields arranged in an offset, quadrature pattern for a plurality of adjacent tracks, as shown in FIG. 3. More particularly, FIG. 3 shows the position field 80 to comprise burst patterns A, B, C and D having selected geometries and magnetization vectors, defining a plurality of track boundaries identified as 0–5. Thus, each track comprises the area bounded by two adjacent track boundaries (e.g., the track 46 of FIG. 1 is represented in FIG. 3 to be bounded by the track boundaries 0 and 1). Additionally, the head 32 of FIG. 1 is represented in FIG. 3 as being centered on the track 46. The direction of rotation of the disc assembly 40 (and hence the position field 80) relative to the head 32 is shown by arrow 82.

Both the A and B burst patterns are shown to extend from the center of one track to the center of an immediately adjacent track, with these patterns offset in a "checkerboard" fashion. Additionally, the C and D burst patterns extend from one track boundary to the next track boundary, with these patterns also offset as shown. Thus, as the head 32 passes over the position field 80 on track 46, the head will pass over portions of the A and B burst patterns (identified as 84 and 86, respectively) and then over C burst pattern 88. However, the head 32 will not encounter D burst pattern 90, as this pattern is on an adjacent track. For reference, tracks having C burst patterns are referred to as "even tracks" and tracks with D burst patterns are referred to as "odd tracks".

Generally, it will be recognized that when the head 32 is centered at the mid-point of track 46, the amplitude of an A burst signal induced in the head 32 by the A burst pattern 84 will be equal to the amplitude of a B burst signal induced in the head by the B burst pattern 86. Moreover, the amplitude of a C burst signal induced by the C burst pattern 88 will have a maximum value and the amplitude of a D burst signal from the D burst pattern 90 will be nominally zero. Further, when the head 32 is positioned over the track boundary 1, the amplitudes of the C and D burst signals from the patterns 88 and 90 will be equal in magnitude, the B burst signal from the pattern 86 will have a maximum value and the A burst from the pattern 84 will be zero. Thus, as the head 32 is swept from one track boundary to the next, the amplitudes of the A, B, C and D burst signals cycle between zero and maximum values, as generally illustrated in FIG. 4.

Figure 4:
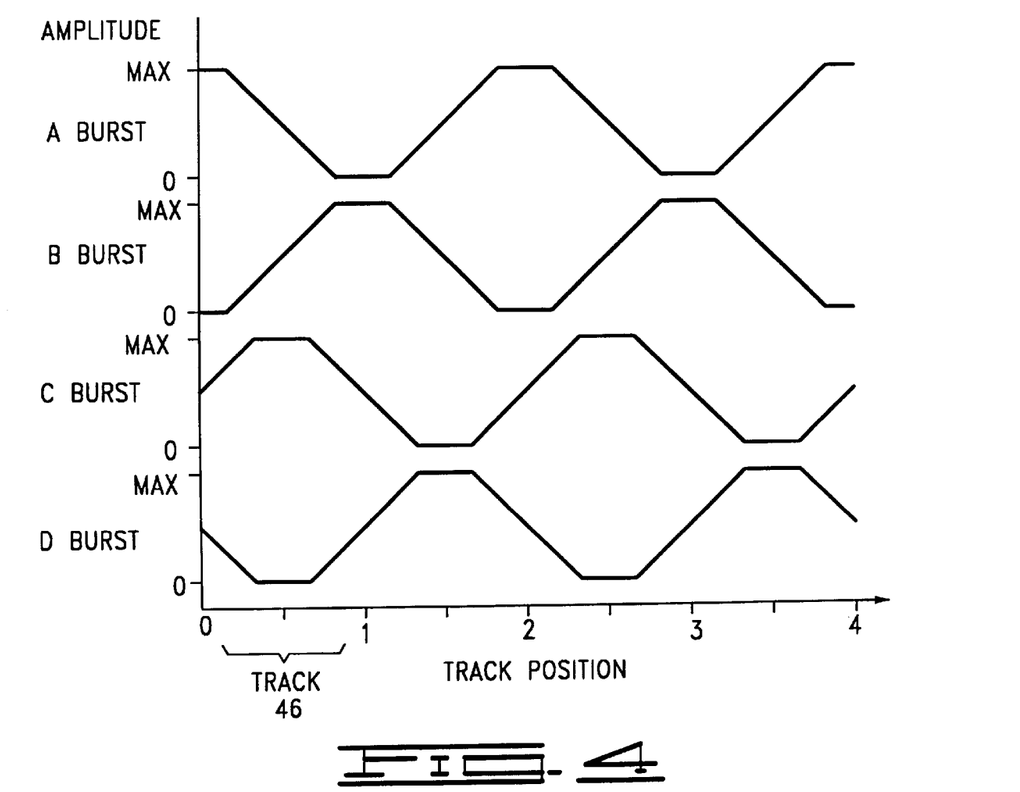
FIG. 4 provides a graphical representation of the amplitudes of the A, B, C and D burst signals from the four position burst fields of FIG. 3.

FIG. 4 provides a graphical representation of the amplitudes of the A, B, C and D burst signals as the head 32 is moved from track boundary 0 to track boundary 4 in FIG. 3. More particularly, FIG. 4 plots each of the burst signals along a common horizontal axis indicative of radial track position and an aligned vertical axis indicative of the amplitude for each of the burst signals from a value of zero to a maximum value. As in FIG. 3, the track 46 is shown in FIG. 4 to comprise the interval between the values of 0 and 1 on the horizontal axis.

Figure 5:
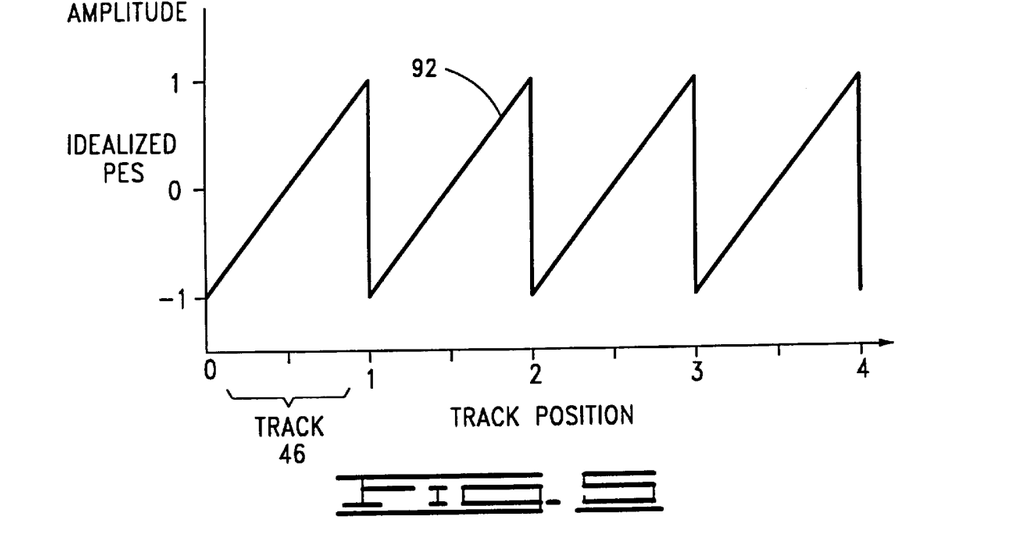
FIG. 5 shows an idealized representation of a linear position error signal generated from the burst signals of FIG. 4.

Referring to FIG. 5, shown therein is a graphical representation of an idealized PES curve 92 generated from the burst signals of FIG. 4. The PES curve 92 has an amplitude that generally ranges in a linear fashion from a minimum value of −1 to a maximum value of +1 as the head is positioned across a track from one track boundary to the next. That is, the PES has a nominal value of zero when the head 32 is positioned at the center of a selected track and the PES increases and decreases, respectively, in a linear fashion as the head is positioned toward the track boundaries. In this way, the amplitude and polarity of the PES curve 92 readily indicate the relative distance and direction of the position of the head 32 with respect to a selected track center and can thus be used to generate the appropriate correction signal to move the head to the center of the selected track. It will be understood that, in a digital servo system, the PES comprises a range of digital values across each track from one track boundary to the next; however, it is conventional to express the relative sample values of the PES in a normalized, analog fashion as shown on the vertical axis of FIG. 5.

Having concluded the discussion with regard to FIGS. 1–5, particular features of the preferred embodiment of the present invention will now be discussed. Accordingly, to distinguish between erroneous PES samples and true PES samples, the servo loop 50 first operates to generate a difference term as a selected combination of PES samples. More particularly, the difference term, $A_n$, is defined by the following relationship:

$$A_n = |S_n - 2S_{n-1} + S_{n-2}| \quad (1)$$

with n being an integer representative of each sequential sample of servo burst signals received by the servo loop 50, $S_n$ representing the PES sample at sample n, $S_{n-1}$ being the previous PES sample and $S_{n-2}$ being the second previous PES sample. Thus, the difference term $A_n$, which is a second difference of the PES, is generated from three successive PES samples and used in the identification of servo defects, as described more fully hereinbelow.

Generally, however, the ability of the second difference $A_n$ to detect erroneous PES samples is illustrated by FIG. 6, which provides a graphical representation of PES samples (curve 102) and second difference terms (curve 104) generated therefrom, in accordance with equation (1) above. The horizontal axis of FIG. 6 represents a sample number n in a sequence of samples (for reference, there are 160 samples in this example). The vertical axis of FIG. 6 represents track width, with 0% indicative of the center of the selected track and variations therefrom indicative of the percentage of track-width away from track center.

For purposes of illustration, the curve 102 of FIG. 6 is considered to be generated as a result of the servo loop 50 of FIG. 1 operating to maintain the head 32 (of FIG. 3) nominally over the center of the track 46 (also shown in FIG. 3). That is, each PES sample of the curve 102 of FIG. 6 is generated in accordance with the magnitudes of servo burst signals (of FIG. 4) generated by the head 32 from servo fields 80 associated with the track 46. Further, the curve 104 is generated from the PES samples of the curve 102, using equation (1) above. It will be recognized that, as a result of the absolute value function included in equation (1), all of the points of the curve 104 are above the center of the track 46 (i.e., above 0%).

As shown in FIG. 6, servo defects are represented at points 106, 108 and 110 of the curve 102, each of which provide generally localized spikes in the PES. More particularly, the PES samples at points 106, 108 and 110 are representative of localized excursions in the PES. These excursions in the PES (falsely) indicate to the servo loop 50 that the head 32 has moved to positions substantially away from the center of the track 46, when in fact the PES samples at points 106, 108 and 110 are erroneous, in that no such excursions by the head 32 have actually taken place at the points 106, 108 and 110.

As a result of the erroneous PES samples at points 106, 108 and 110, in this example the servo loop 50 operates to correct these indicated excursions by outputting a correction signal to move the head 32 to the center of the track 46. However, as the head 32 is not actually off-track at the points 106, 108 and 110, the operation of the servo loop 50 to correct the position of the head 32 results in large excursions of the head 32 in the opposite direction, as indicated at points 112, 114 and 116. Thus, the erroneous PES samples at points 106, 108 and 110 result in undesirable corrections and oscillation of the head 32 at points 112, 114 and 116 (and beyond), immediately following the erroneous PES samples.

Additionally, the prior art methodology of detecting off-track conditions by comparing the value of each PES sample to a predetermined threshold, which is typically a value such as 10% off track center, would result in the detection of the second two erroneous PES samples at points 108 and 110, but not the erroneous PES sample at point 106. Thus, the marginal servo defect at point 106 would not be detected using the prior art methodology of detecting off-track conditions using an offtrack threshold of 10%, although the marginal servo defect at point 106 results in excessive oscillation of the PES, as shown.

Continuing with FIG. 6, the curve 104, showing the second difference of the PES samples of curve 102, accurately detects the defects at points 106, 108 and 110 of the curve 102. That is, the curve 104 includes localized peaks at points 118, 120 and 122, each of which closely follow (by two sample points) the erroneous PES samples indicated at points 106, 108 and 110 of the curve 102. Moreover, the values of the second difference curve 104 at points 118, 120 and 122 have magnitudes that are significantly greater than the magnitudes at remaining portions of the curve 104.

From FIG. 6, it will be recognized that the value of the second difference $A_n$ will provide a relatively large increase in magnitude subsequent to each erroneous PES sample in the PES. However, reliable detection of servo defects in the PES (as compared to actual excursions of the head) has been found to be improved through the characterization of changes in magnitude of the second difference $A_n$.

Figure 7:
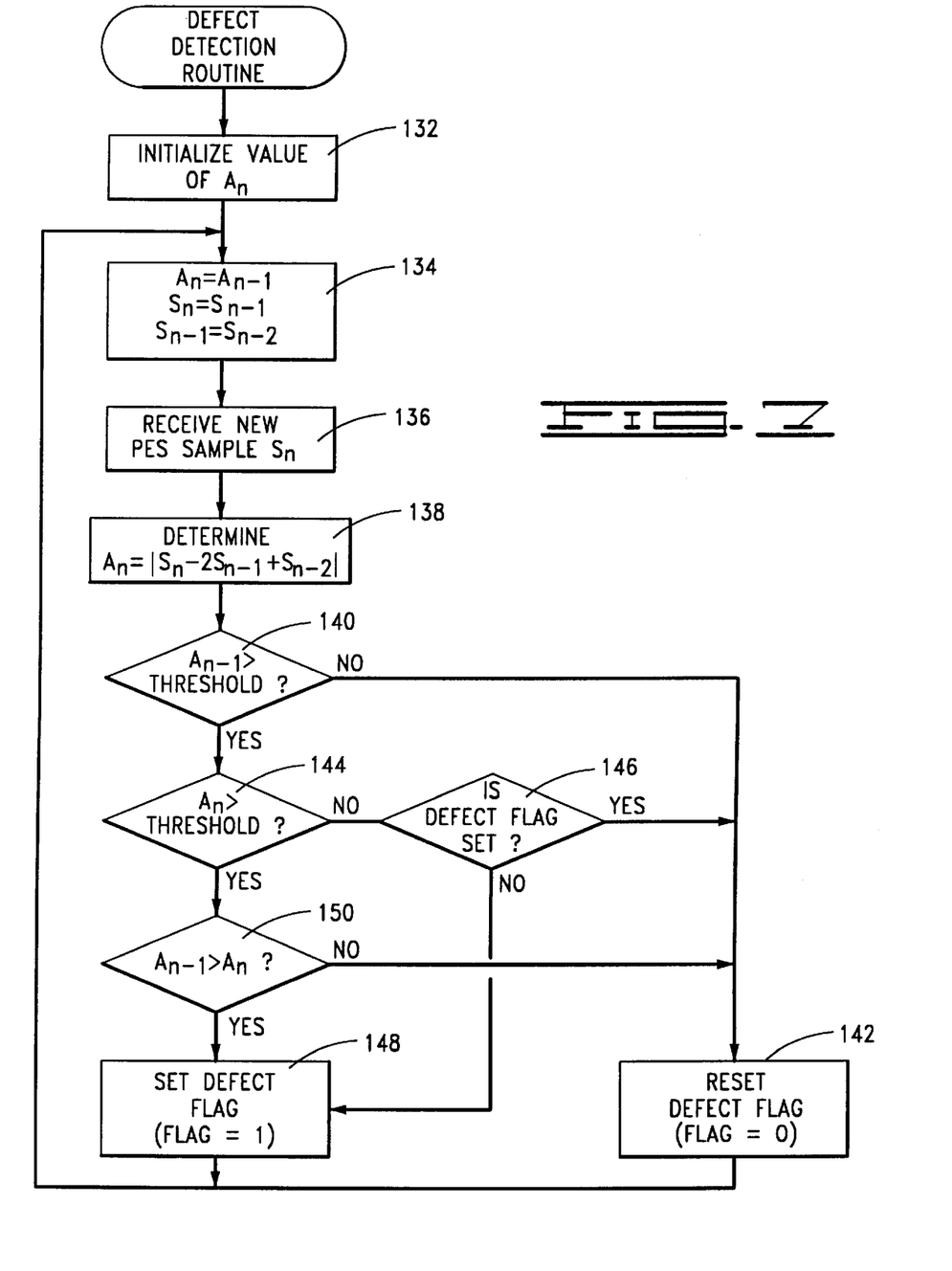
FIG. 7 is a generalized flow-chart representative of a DEFECT DETECTION routine used by the servo microprocessor of FIG. 1 in accordance with the present invention to detect servo defects in the servo information written to the disc drive.

Referring now to FIG. 7, shown therein is a flow chart for a DEFECT DETECTION routine performed by the servo loop 50 (of FIG. 1) during read and write operations wherein a selected head is positioned over the center of a selected track of the disc drive 10. More particularly, the DEFECT DETECTION routine of FIG. 7 is representative of programming stored in RAM 60 (FIG. 1) and used by the servo microprocessor 58 during operation of the servo loop 50.

As will be recognized, the DEFECT DETECTION routine is performed in conjunction with other conventional operations of the servo loop 50, so that the servo loop 50 continuously operates to maintain the head 32 over the selected track and still detects off-track conditions by comparing the PES to a predetermined threshold value (such as, for example a value corresponding to 10% of the track width). However, the DEFECT DETECTION routine will further enable the disc drive 10 to distinguish off-track conditions occurring as a result of external shocks or vibration, from off-track conditions occurring as a result of a servo defect. Moreover, the DEFECT DETECTION routine will detect marginal servo defects which are not sufficiently large to cause an off-track condition.

As shown in FIG. 7, the DEFECT DETECTION routine begins at block 132, wherein the value of $A_n$ is initialized. As provided by eqation (1) above, the first value of $A_n$ requires receipt of three consecutive PES samples ($S_{n-2}$, $S_{n-1}$ and $S_n$). Thus, once the servo loop 50 begins track following mode, the routine of FIG. 7 waits for three samples of servo bursts (and resulting PES samples) before the first second difference value is generated by block 132. Thereafter, the routine passes to block 134, wherein the value of $A_n$ determined by block 132 is set to $A_{n-1}$. Additionally, the PES sample $S_{n-1}$ is set to $S_{n-2}$ and the PES sample $S_n$ is set to $S_{n-1}$, in preparation for receipt of the next PES sample (which is identified as $S_n$), at block 136.

Once the new $S_n$ sample is received by block 136, a new value for the second difference $A_n$ is determined, as shown by block 138. At this point, values are now available for both $A_n$ and $A_{n-1}$, and it is the relative magnitudes of these two second difference values which determine the presence of servo defects. For purposes of discussion herein, $A_n$ will be referred to as the present second difference and $A_{n-1}$ will be referred to as the previous second difference. Although not shown as such in FIG. 7, it will be recognized that the previous second difference $A_{n-1}$ can be considered as being generated from the three immediately previous samples $S_{n-1}$, $S_{n-2}$, and $S_{n-3}$, with reference to the present sample, $S_n$.

Continuing with FIG. 7, decision block 140 compares the magnitude of the previous second difference $A_{n-1}$ to a predetermined defect threshold value. This threshold value is preferably experimentally determined, but generally corresponds, for example, to a selected percentage of the width of the track, such as 20% (see FIG. 6). At such time that the previous second difference $A_{n-1}$ does not exceed the defect threshold value, the flow of FIG. 7 passes to block 142, wherein a defect flag is reset to a value indicating the absence of a servo defect (such as, for example defect flag=0). As will be recognized, the defect flag can correspond, for example, to a bit in memory which is periodically polled by the servo microprocessor 58 or by a disc drive system microprocessor (not shown). Operations by the disc drive 10 in response to the defect flag will be discussed more fully hereinbelow.

At such time that the previous second difference $A_{n-1}$ does exceed the defect threshold value, the flow of FIG. 7 continues to block 144, wherein the present second difference $A_n$ is likewise compared to the defect threshold value. At such time that the present second difference $A_n$ does not exceed the defect threshold value, the flow passes to decision block 146, where the routine queries whether the defect flag (discussed above with reference to the block 142) has been previously set during a previous pass of the routine. If so, the routine passes to the block 142, wherein the defect flag is reset to the value indicative of no servo defect. If not, the routine passes from decision block 146 to block 148, wherein the defect flag is set to a value indicative of a servo defect (such as, for example defect flag=1).

Returning to the decision block 144, at such time that the present second difference $A_n$ also exceeds the defect threshold value, the flow of FIG. 7 passes to decision block 150, wherein the value of the previous second difference $A_{n-1}$ is compared to the value of the present second difference $A_n$. At such time that $A_{n-1}$ is less than $A_n$, the flow passes as shown to block 142, wherein the defect flag is reset. However, at such time that $A_{n-1}$ is greater than $A_n$, the flow passes from the decision block 150 to block 148, wherein the defect flag is set to indicate the presence of a servo defect.

Once the routine passes to either block 142, wherein the defect flag is set to 0 (indicative of no servo defect) or to block 148, wherein the defect flag is set to 1 (indicative of the presence of a servo defect), the routine returns as shown back to block 134, wherein the routine prepares for receipt and evaluation of the next PES sample. The routine of FIG. 7 thus, continues to operate until such time that the servo loop 50 discontinues track following and moves to another mode of operation, such as a seek to a new track. Once the servo loop 50 has moved the head 32 to a new track, the DEFECT DETECTION routine of FIG. 7 again is initiated and performed, in accordance with the foregoing description.

The defect flag, once set, indicates to the servo loop 50 that second previous sample $S_{n-2}$ was erroneous and did not represent the true position of the head 32. As a result, the servo loop 50 can operate to mark the particular sector associated with the erroneous PES sample so that future operation of the servo loop will disregard the PES sample in determining the position of the head 32.

Although the second difference $A_n$ has been determined in accordance with eqation (1) above, it is contemplated that other combinations of PES samples can be used as desired in order to provide the second difference $A_n$. Additionally, although the routine of FIG. 7 operates to compare the present second difference $A_n$ with the immediately previous second difference $A_{n-1}$, it is contemplated that additional combinations for the second difference can be used in any particular application in order to provide the requisite level of servo defect detection.

It will be clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive of the type including a disc and an actuator adjacent the disc, the actuator having a head and an actuator coil of a voice coil motor, the disc having a surface including a plurality of nominally concentric tracks, the tracks including servo position fields read by the head to provide servo burst samples having magnitudes indicative of the position of the bead with respect to the servo position fields, the disc drive further generating a sequence of position error signal samples from the servo burst samples, each position error signal sample having a polarity and a magnitude, the disc drive applying current to the actuator coil to position the head with respect to the tracks in response to the polarity and magnitudes of the position error signal samples, a method for detecting erroneous position error signal samples in the sequence of position error signal samples, comprising the steps of:

providing a first set of samples from the sequence of position error signal samples, the first set of samples having at least two samples;

generating digital representations of a second difference term from a selected combination of the first set of samples, the digital representations of the second difference term having a magnitude determined from the relative magnitudes of the samples in the first set of samples;

providing a second set of samples from the sequence of position error signal samples, the second set of samples having at least two samples with at least one sample not appearing in the first set of samples;

generating digital representations of a subsequent second difference term from a selected combination of the second set of samples, the digital representations of the subsequent second difference term having a magnitude determined from the relative magnitudes of the samples in the second set of samples; and detecting an erroneous position error signal sample in the sequence of position error signal samples from the magnitudes of the digital representations of the second difference term and the subsequent second difference term.

2. The method of claim 1, wherein the step of detecting an erroneous position error signal sample comprises the step of:

comparing the magnitude of the digital representations of the second difference term to a predetermined threshold value; and comparing the magnitude of the digital representations of the subsequent second difference term to the predetermined threshold value.

3. The method of claim 2, wherein the step of detecting an erroneous position error signal sample further comprises the steps of:

comparing the magnitude of the digital representations of the second difference term to the magnitude of the digital representations of the subsequent second difference term; and detecting the erroneous position error signal sample when the magnitudes of the digital representations of the second difference term exceed the predetermined threshold value and when the magnitude of the digital representations of the second difference term exceeds the magnitude of the digital representations of the subsequent second difference term.

4. The method of claim 2, wherein the step of detecting an erroneous position error signal sample further comprises the step of:

determining whether an erroneous position error signal sample has previously been detected; and detecting the erroneous position error signal sample when the magnitudes of the digital representations of the second difference term and the subsequent second difference term exceed the predetermined threshold and when an erroneous position error signal sample has not previously been detected.

5. The method of claim 1, wherein the second set of samples comprises sequential samples $S_{n-2}$, $S_{n-1}$ and $S_n$, wherein $S_n$ comprises the most recent servo position error signal sample in the sequence, $S_{n-1}$ comprises the servo position error signal sample immediately preceding $S_n$ in the sequence, and $S_{n-2}$ comprises the servo position error signal sample immediately preceding $S_{n-1}$ in the sequence, and wherein the digital representations of the subsequent second difference term are generated from the relationship $|S_n 2 - S_{n-1} + S_{n-2}|$.

6. The method of claim 5, wherein the first set of samples comprises sequential samples Sn–3, Sn–2 and Sn–1, wherein Sn–3 comprises the servo position error signal sample immediately preceding $S_{n-2}$ in the sequence, and wherein the digital representations of the second difference term are generated from the relationship $|S_{n-1} - 2S_{n-2} + S_{n-3}|$.

7. A method for detecting servo defects in a disc drive of the type having a rotatable disc and an actuator assembly adjacent the disc, the actuator assembly including a head, the disc drive including a servo loop for generating a position error signal from servo burst signals provided to the servo loop by the head as the head reads servo information on the disc, the position error signal comprising a sequence of samples and the servo loop positioning the head in response to the values of the samples, the method comprising the steps of:

generating a first difference term as a combination of selected samples from the sequence of position error signal samples, the selected samples defining a first set of samples having at least two samples;

generating a second difference term as a combination of selected samples from the sequence of position error signal samples, the selected samples defining a second set of samples having at least two samples wherein at least one sample from the second set of samples is different from the samples in the first set of samples;

comparing the first and second difference terms to a predetermined threshold value;

detecting the presence of a servo defect when the first and second difference terms exceed the predetermined threshold and the first difference term exceeds the second difference term; and setting a defect flag to indicate the presence of the servo defect.

8. The method of claim 7, wherein the deflect flag is set to indicate the absence of a servo defect when the predetermined threshold exceeds the first difference term.

9. The method of claim 8, further comprising the steps of detecting the presence of a servo defect and setting the deflect flag to indicate the presence of the servo defect at such time that the first difference term exceeds the predetermined threshold, the second difference term does not exceed the predetermined threshold, and the defect flag has been properly set to indicate the absence of a servo defect.

10. A disc drive, comprising:

a rotatable disc, the disc including a surface having servo position fields defining a plurality of concentric tracks;

an actuator assembly adjacent the disc, the actuator assembly including a head and an actuator coil, the head generating servo burst signals from selected servo position fields of a selected track as the disc rotates adjacent the head; and a servo loop, responsive to the servo burst signals, for generating a servo position error signal comprising a sequence of error samples, each error sample having a magnitude and polarity indicative of the relative position of the head with respect to the selected track, the servo loop outputting a current to the actuator coil to position the head relative to the selected track in response to the servo position error signal, the servo loop comprising:

difference means, responsive to the servo position error signal, for generating a difference term as a combination of a plurality of selected samples from the servo position error signal;

previous difference means, responsive to the servo position error signal, for generating a previous difference term as a combination of a plurality of selected samples from the servo position error signal, wherein at least one of the selected samples used to generate the previous difference term is different from the selected samples used to generate the difference term; and detection means, responsive to the difference means and the previous different means, for detecting an erroneous sample in the servo position error signal from the magnitudes of the difference term and the previous difference term, the erroneous sample indicative of a defect in the servo burst signals.

11. The disc drive of claim 10, wherein the detection means detects the erroneous sample by comparing the magnitudes of the differences term and the previous difference, term to a predetermined threshold and setting a deflect flag at such time that the magnitudes of the difference term and the previous difference term exceed the predetermined threshold and the magnitude of the previous difference term exceeds the magnitude of the difference term, the setting of the defect flag indicative of the presence of an erroneous sample.

12. The disc drive of claim 11, wherein the detection means further determines whether the defect flag is presently set to indicate the presence of an erroneous sample, and sets the defect flag at such time that the magnitude of the previous difference term exceeds the predetermined threshold, the magnitude of the difference term does not exceed the predetermined threshold and the defect flag is not presently set.

13. The disc drive of claim 10, wherein the difference means generates the difference term in accordance with the relationship $|S_n - 2S_{n-1} + S_{n-2}|$, wherein $S_n$ comprises the most recent sample, $S_{n-1}$ comprises the sample immediately preceding the $S_n$ sample, and $S_{n-2}$ comprises the sample immediately preceding the $S_{n-2}$ sample in the servo position error signal.

14. The disc drive of claim 13, wherein the previous difference means generates the previous difference term in accordance with the relationship $|S_{n-1} - 2S_{n-2} + S_{n-3}|$, wherein $S_{n-3}$ comprises the sample immediately preceding the $S_{n-2}$ sample in the servo position error signal.

* * * * *

UNITED STATES PATENT AND TRADEMARK OFFICE
CERTIFICATE OF CORRECTION

PATENT NO.   : 5,930,068
DATED        : July 27, 1999
INVENTOR(S)  : Jason D. Gregg and Timothy T. Walker It is certified that error appears in the above-identified patent and that said Letters Patent is hereby corrected as shown below:

<u>Title page,</u>
Item [56], References Cited, replace "omitted" with -- 5,262,907 11/1993 Duffy et al. --.
Item [56], References Cited, replace "omitted" with -- 5,136,439 8/1992 Weispfenning et al. --.

<u>Column 11,</u>
Line 14, replace "position of the bead" with -- position of the head --.

Formula 1, replace "$|S_n 2 - S_{n-1} + S_{n-2}|$." with -- $|S_n - 2S_{n-1} + S_{n-2}|$. --

<u>Column 14,</u>
Line 6, replace "of the differences term" with -- of the difference term --.
Line 7, replace "previous difference, term" with -- previous difference term --.

Signed and Sealed this

Sixth Day of August, 2002

*Attest:*

JAMES E. ROGAN
*Attesting Officer*   Director of the United States Patent and Trademark Office